United States Patent [19]

Gill

[11] Patent Number: 4,963,399

[45] Date of Patent: Oct. 16, 1990

[54] POLYURETHANE FOAM WITH LOW VINYL-STAINING TENDENCIES

[75] Inventor: William A. Gill, Hurricane, W. Va.

[73] Assignee: Union Carbide Chemicals and Plastics Company, Inc., Danbury, Conn.

[21] Appl. No.: 169,082

[22] Filed: Mar. 16, 1988

Related U.S. Application Data

[63] Continuation of Ser. No. 32,771, Mar. 31, 1987, abandoned.

[51] Int. Cl.$^5$ .............................................. B05D 3/02
[52] U.S. Cl. ................................... 427/373; 521/115; 521/129
[58] Field of Search ................ 427/373; 521/115, 129, 521/164, 163, 167

[56] References Cited

U.S. PATENT DOCUMENTS

| | | | |
|---|---|---|---|
| 3,311,574 | 7/1967 | Bowering et al. | 260/2.5 |
| 3,446,694 | 5/1969 | Hoskinson et al. | 161/160 |
| 3,647,848 | 3/1972 | Wagner et al. | 260/453 |
| 3,849,156 | 11/1974 | Marlin et al. | 427/373 |
| 3,862,879 | 1/1975 | Barron et al. | 427/373 |
| 4,132,817 | 1/1979 | Tillotson | 427/373 |
| 4,175,155 | 11/1979 | Biranowski et al. | 427/373 |
| 4,176,210 | 11/1979 | Skinner | 427/373 |
| 4,288,564 | 9/1981 | Conover et al. | 521/122 |
| 4,296,213 | 10/1981 | Cuscurida et al. | 521/164 |
| 4,331,778 | 5/1982 | Sommerfield et al. | 521/129 |
| 4,442,235 | 4/1984 | Taylor et al. | 521/122 |
| 4,452,924 | 6/1984 | Radovich | 521/129 |
| 4,517,313 | 5/1985 | Nakatani | 521/51 |
| 4,518,778 | 5/1985 | Cuscurida | 521/164 |
| 4,642,320 | 2/1987 | Turner et al. | 521/164 |
| 4,710,521 | 12/1987 | Soukup et al. | 427/373 |
| 4,775,558 | 10/1988 | Haas et al. | 427/373 |

FOREIGN PATENT DOCUMENTS

| | | |
|---|---|---|
| 176013 | 9/1984 | European Pat. Off. . |
| 2446214 | 4/1976 | Fed. Rep. of Germany ...... 427/373 |
| 77267 | 7/1978 | Japan ................................ 427/373 |

OTHER PUBLICATIONS

Catalytic amine crosslinters for Polyurethanes, Taylor et al., Plastics Compounds, Nov./Dec. 1986, p. 43.

*Primary Examiner*—John Kight, III
*Assistant Examiner*—Dennis R. Daley
*Attorney, Agent, or Firm*—B. L. Deppenbrock

[57] ABSTRACT

This invention relates to a process for the manufacture of polyurethane foams which exhibit a reduced tendency to stain vinyl films with which they are in contact, such as are produced for use in automobile interiors.

14 Claims, No Drawings

POLYURETHANE FOAM WITH LOW VINYL-STAINING TENDENCIES

This application is a continuation of prior U.S. application Ser. No. 032,771 filing date Mar. 31, 1987, now abandoned.

BACKGROUND OF THE INVENTION

1. Field of the Invention

This invention relates to polyurethane foams suitable for contact with vinyl films and to processes for their manufacture. More specifically, this invention relates to a process for the manufacture of polyurethane foams which exhibit a reduced tendency to stain vinyl films with which they are in contact.

2. Description of the Prior Art

The use of molded polyurethane products having vinyl films adhered thereto has increased dramatically in recent years. These products now commonly appear in automotive interiors as dashboards, door linings and arm rests as well as in in many furniture-related applications.

While these materials perform excellently in these applications, they possess a deficiency which has been widely recognized. Specifically, the staining of the vinyl film has been found to be caused by components of the polyurethane to which it is adhered. This staining problem is especially prevalent in environments wherein elevated temperatures exist, such as in automobile interiors, since the severity of the staining appears to vary directly with temperature.

Amine catalysts present in the polyurethane foams have been found to be responsible for vinyl staining. Various solutions to this problem have been proposed. For instance, JA59-191743 discloses the use of the reaction product of dimethylaminepropylamine and carbonic acid as a catalyst for use in the manufacture of polyurethane. The use of this catalyst is stated to reduce odor and vinyl staining relative to the use of standard triethylene amine catalysts. EP 176,013 discloses the use of specific aminoalkylurea catalysts in the manufacture of polyurethanes. Use of these catalysts is also said to reduce odor and the staining of vinyl films adhered thereto. The references allegedly accomplish this reduction in odor and vinyl staining through the use of relatively high molecular weight amine catalysts. Due to their high molecular weight, these amine catalysts are unable to readily migrate through a polyurethane foam and thus, their propensity to produce odors and stain vinyl films. However, when subjected to elevated temperatures as are commonly encountered in automobile interiors, these compounds migrate within a foam to some degree Therefore, there continues to be a need for alternate means to control vinyl staining by polyurethane compositions.

It has now been found that other components of polyurethane compositions are also responsible for vinyl staining. Specifically, it has been found that amine containing cross-linking compounds, as described herein, incorporated in a polyurethane composition will also promote vinyl staining.

Objects of the Invention

Accordingly, it is a primary object of the present invention to provide a process for the manufacture of polyurethane foam materials which exhibit a reduced tendency to stain vinyl films with which they are in contact.

It is a further object of the present invention to provide a process for the manufacture of polyurethane foam materials which are relatively odorless.

These and other objects of the invention will be apparent from the description of the invention set forth hereinafter.

SUMMARY OF THE INVENTION

This invention provides a process for the production of polyurethane foams which are relatively odorless and which exhibit a reduced tendency to stain vinyl films with which they are in contact.

More particularly, the present invention provides a process for the production of polyurethane foams which possess a reduced tendency to stain vinyl films in contact therewith comprising;
(a) forming a reaction mixture comprising
  (i) at least one polyol;
  (ii) at least one polyisocyanate;
  (iii) a catalyst consisting essentially of at least one amine catalyst having an average molecular weight no greater than 160, wherein said amine catalyst comprises no greater than about 1.0 wt. % of the reaction mixture; and
(b) reacting the reaction mixture under suitable conditions to form a polyurethane foam therefrom.

The present invention further provides a process for the production of semi rigid polyurethane foams which possess a reduced tendency to stain vinyl films in contact therewith comprising;
(a) forming a reaction mixture comprising
  (i) at least one polyol
  (ii) at least one isocyanate
  (iii) a catalyst consisting essentially of at least one amine catalyst having an average molecular weight no greater than about 160;
  (iv) at least one amine cross-linker, said amine and said amine cross-linker being present in such amounts such that their sum comprises no greater than about 2.0 wt. % of the reaction mixture; and
(b) reacting the reaction mixture under suitable conditions to form a polyurethane foam therefrom.

DETAILED DESCRIPTION OF THE INVENTION

In accordance with the present invention, a process for the production of polyurethane foams is provided, whereby foams of relatively low odor are produced. Furthermore, the polyurethane foams produced in accordance with the invention exhibit a reduced tendency to stain vinyl films with which they are in contact.

The production of polyurethane products is well known. Generally, it involves the reaction of a polyol composition and an organic polyisocyanate in the presence of a suitable catalyst. The reaction is generally carried out in the presence of a blowing agent and a foam stabilizer.

The polyol or blends thereof, employed depends upon the end use of the polyurethane product to be produced. The molecular weight or hydroxyl number of the base polyol may thus be selected so as to result in flexible, semi flexible, or rigid foams or elastomers when the polymer/polyol produced from the base polyol is converted to a polyurethane. The hydroxyl number of the polyol or polyols employed can accordingly vary over a wide range. In general, the hydroxyl number of the polyols employed may range from about 20 (or lower) to about 150 (and higher).

For example, when foams are to be prepared, the molecular weight or the hydroxyl number may be selected to result in flexible, semi-flexible, or rigid foams. The polyols in this instance preferably possess a hydroxyl number of at least 150 for rigid foams, from about 50 to about 150 for semi-flexible foams, and from about 20 to about 70 for flexible foams. As a further refinement, the specific foam application will likewise influence the choice of base polyol. As an example, for molded foam, the hydroxyl number of the base polyol may be on the order of about 20 to about 40, and for slabstock the hydroxyl number may be on the order of about 25 to about 75.

As a further example, for elastomer applications, it will generally be desirable to utilize relatively high molecular weight base polyols having relatively low hydroxyl numbers, e.g., about 20 to about 50.

The hydroxyl number limits described above are not intended to be restrictive, but are merely illustrative of the large number of possible combinations for the polyol or polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where
OH = hydroxyl number of the polyol
f = functionality, that is, average number of hydroxyl groups per molecule of polyol
m.w. = number average molecular weight of the polyol.

Substantially any of the polyols previously used in the art to make polymer/polyols can be used as the base polyol in this invention. Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:
(a) alkylene oxide adducts of polyhydroxyalkanes;
(b) alkylene oxide adducts of nonreducing sugars and sugar derivatives;
(c) alkylene oxide adducts of phosphorus and polyphosphorus acids;
(d) alkylene oxide adducts of polyphenols;
(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3- 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation productions of phenol and formaldehyde, and novolac resins; condensation products of various phenolic compounds and acrolein; the simplest member of this class being 1,2,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Indeed, any material having an active hydrogen as determined by the Zerewitinoff test may be utilized as the base polyol. For example, amine-terminated polyether polyols are known and may be utilized, if desired.

The most preferred base polyols employed in this invention include the poly(oxypropylene) glycols, triols, and higher functionality polyols, and the like that are capped with ethylene or propylene oxide as dictated by the reactivity requirements of the particular polyurethane application. Generally, the nominal functionality of such polyols will be in the range of about 3 to 4 or so. These polyols also include poly(oxypropylene-oxyethylene) polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain.

Polymer polyols may also be employed in the practice of the claimed invention. Polymer-polyols are well known in the art. The basic technology is disclosed in Stamberger U.S. Pat. No. Re. 28,715 and U.S. Pat. No. Re. 29,118. Generally, in order to produce a conventional polymer/polyol, an ethylenically unsaturated monomer is polymerized in situ in an appropriate polyol. The polymerization produces a stable dispersed polymer in the polyol. The polymer dispersion, known as a polymer-polyol, can be employed as a reactant in a number of reactions (e.g., polyurethane-forming reactions) to introduce into the resultant product, as an integral part thereof, both the polyol and the dispersed polymer.

More specifically, conventional polymer polyols may be produced by the following steps which are known in the art:
(a) dispersing an ethylenically unsaturated monomer in a polyol, and (b) polymerizing said monomer in said polyol by free radical addition polymerization in the presence of a conventional free-radical catalyst to provide a stable dispersion of polymer polyol.

Polymer polyols may be produced by polymerizing the ethylenically unsaturated monomers in the selected polyol at a temperature of from about 40° C. to 150° C. in the presence of a catalytically effective amount of a conventional free radical catalyst known to be suitable for the polymerization of ethylenically unsaturated monomers. In batch processing, the monomers may be fed into the polyol over about three hours while maintaining the polyol at about 80°-130° C., and the reactants are then maintained about 110° -130° C for an additional hour. In the preferred continuous operation, monomer and polyol are introduced at rates which give an average residence time of about 10 to about 80 minutes, while reaction temperature is maintained in the range of about 110° C. to about 130° C.

Preferably, the polyols of those described above that are employed for producing polymer-polyols are hydroxyl-terminated polyesters, polyhydroxyalkanes, polyphenols, polyoxyalkylene polyols, or the like and the corresponding mercapto derivatives, all of which are described in more detail above.

The monomers which may be used are the polymerizable monomers characterized in that they have at least one polymerizable ethylenically unsaturated group of the type, (C=C). The monomers can be used singly or in combination to produce homopolymer/polyol or copolymer/polyol reactive compositions.

These monomers are well known in the art and include the hydrocarbon monomers such as butadiene, isoprene, 1,4-pentadiene, 1,6-hexadiene, 1,7 octadiene, styrene, alpha-methylstyrene, para-methylstyrene, 2,4-dimethylstyrene, ethylstyrene, isopropylstyrene, butylstyrene, phenylstyrene, cyclohexylstyrene, benzylstyrene and the like, substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, hydroxypropyl acrylate, 2-hydroxyethyl acrylate, 2-hydroxyethyl methacrylate, methyl methacrylate, cyclohexyl methacrylate, benzyl methacrylate, isopropyl methacrylate, hydroxypropyl methacrylate, octyl methacrylate, methacrylonitrile, methyl alpha-chloroacrylate, ethyl alpha-ethoxyacrylate, methyl alpha acetamidoacrylate, butyl acrylate, 2-ethylhexyl acrylate, phenyl acrylate, phenyl methacrylate, acrylonitrile, alpha-chloroacrylo-nitrile, substituted acrylamides including N,N-dimethylacrylamide, N,N-dibenzylacrylamide, and methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl chloride, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 2,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, t-butylaminoethyl methacrylate, dimethylaminoethyl methacrylate, glycidyl acrylate, allyl alcohol, glycol monoesters of itaconic acid, diglycol esters of itaconic acid, methyl monoester of itaconic acid, dichloro- butadiene, vinyl pyridine, and the like. Any of the known polymerizable monomers can be used and the compounds listed above are illustrative and not restrictive of the monomers suitable for use in this invention. Preferably, styrene, acrylonitrile and vinylidene chloride are used.

Illustrative of catalysts which can be used in producing polymer-polyols are the well-known free radical types of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, t-butyl peroxybenzoate, alpha,alpha'-azo-2-methyl butyronitrile, alpha,alpha'-2-methyl heptonitrile, 1,1'-azo-1-cyclohexane carbonitrile, dimethyl alpha,alpha'-azo-isobutyrate, 4,4'-azo-4-cyanopentanoic acid, azo-bisisobutyronitrile, persuccinic acid, diisopropyl peroxy dicarbonate, and the like. A mixture of catalysts may also be used.

The concentration of the catalyst can vary from about 0.001 to about 5 percent, preferably from about 0.2 to about 1.0 percent. However, any effective catalytic amount is satisfactory.

The polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, and N,N dimethylacetamide.

Acceptable polymer-polyols normally have an average polymer particle size ranging from about 1 to about 6 microns; preferably, from about 1 to about 3 microns; and most preferably, about 1 micron to about 2 microns. Polymer polyols having particles of maximum diameter of less than 1 micron are considered for the purposes of this invention to be on the borderline of invisibility when examined under a microscope. Polymer polyols having particles of 1–3 microns maximum diameter are considered to be of medium size. Polymer-polyols having particles of 4–6 microns maximum diameter are considered to be of large size.

Polymer-polyols should contain from about 5 to 60% by weight of dispersed polymer. A preferable concentration is about 20 to 50% by weight. Polymer-polyols having in excess of about 60% by weight of dispersed polymer are ordinarily too viscous for practical purposes The organic polyisocyanates that are useful in producing polyurethane products in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4 diisocyanatotoluene, 2,6-diisocyanatotoluene, methylene bis(4-cyclohexyl isocyanate),
1,2-diisocyanatoethane, 1,3-diisocyanatopropane,
1,2-diisocyanatopropane, 1,4-diisocyanatobutane,
1,5-diisocyanatopentane, 1,6-diisocyanatohexane,
bis(3-isocyanatopropyl)ether,
bis(3-isocyanatopropyl) sulfide,
1,7-diisocyanatoheptane,
1,5-diisocyanato-2,2-dimethylpentane,
1,6-diisocyanato-3-methoxyhexane,
1,8-diisocyanatooctane,
1,5-diisocyanato-2,2,4-trimethylpentane,
1,9-diisocyanatononane, 1,10-diisocyanatodecane,
1,11-diisocyanatoundecane,
1,12-diisocyanatododecane, bis(isocyanatohexyl) sulfide, 1,4-diisocyanatobenzene,
3,5-diisocyanato-o-xylene,
4,6-diisocyanato-m-xylene,
2,6-diisocyanato-p-xylene,
2,4-diisocyanato-1-chlorobenzene,
2,4-diisocyanato-1-nitrobenzene,
2,5-diisocyanato-1-nitrobenzene,
4,4'-diphenylmethylene diisocyanate,
2,4'-diphenylmethylene diisocyanate,
3,3'-diphenylmethylene diisocyanate, polymethylene poly(phenyleneisocyanates), and mixtures thereof The preferred polyisocyanates for the production of rigid or semi rigid foams are polymethylene poly(phenyleneisocyanates), the 2,4' 3,3' and 4,4' isomers of diphenylmethylene diisocyanate and mixtures thereof. For the production of flexible foams, the preferred polyisocyanates are 2,4-diisocyanatotoluene and 2,6 diisocyanatotoluene.

The amine catalysts which are employable in the claimed process are those having molecular weights below about 160, and preferably below about 145. The following catalysts are therefore exemplary of those catalysts which are useful in the practice of the present invention: triethylamine, bis(2-dimethylaminoethyl)ether, dimethylethanolamine, N-methyldiethanolamine, 2-(2-dimethylaminoethoxy)ethanol and mixtures thereof. The following catalysts are preferred: bis(2-dimethylaminoethyl)ether, dimethylethanolamine and N-methyldiethanolamine and mixtures thereof. Most preferred is a mixture of bis(2-dimethylaminoethyl) ether (about 15 wt. %) and dimethylethanolamine (about 85 wt. %).

Other known non amine catalysts which may optionally be used in conjunction with the above-described amine catalysts are: (a) tertiary phosphines such as trialkylphosphines, dialkylbenzylphosphines, and the like; (b) strong bases such as alkali and alkaline earth metal hydroxides, alkoxides, and phenoxides; (c) acidic metal salts of strong acids such as ferric chloride, stannic chloride, stannous chloride, antimony trichloride, bismuth nitrate and chloride, and the like; (d) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone- alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (e) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (f) salts of organic acids with a variety of metals such as alkali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate, and the like; (g) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin bis(4-methylaminobenzoate), dibutyltin bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide) dibutyltin-bis(2-dimethylaminopentylate), dibutyltin dichloride, dioctyltin dichloride, and the like.

The above-described metal catalysts, or combinations of metal catalysts, may be employed in conjunction with the above-described amine catalysts.

The catalysts are employed in small amounts, for example, from about 0.001 percent to about 5 percent, based on the weight of the reaction mixture. However, the total weight of the amine catalysts should not exceed 1.0 wt.% of the total polyurethane-producing reaction mixture. Preferably, the total weight of the amine catalysts should not exceed 0.8 weight percent. Most preferably, the total weight of the amine-containing catalysts should not exceed 0.6 weight percent of the total polyurethane-producing reaction mixture.

A blowing agent may be employed in the reaction mixture. Suitable blowing agents include water and other agents which are vaporized by the exotherm of the reaction, or mixtures thereof. Illustrative polyurethane blowing agents include water, halogenated hydrocarbons such as trichloromono fluoromethane, dichlorodifluoromethane, dichloromonofluoromethane, dichloromethane, trichloromethane, 1,1-dichloro1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl N,N'-dinitrosoterephthalamide, amine formates, and the like. The generally preferred method of foaming for producing flexible foams is the use of water, or a combination of water plus a fluorocarbon blowing agent such as trichloromonofluoromethane in amounts ranging from about 0.5 to about 5.0 weight percent based upon the weight of polyol or polymer/polyol present in the reaction mixture. However, the precise quantity of blowing agent employed will vary with factors such as the density desired in the foamed product.

If the polyurethane foam is to be a semi-rigid foam, its preparation usually includes the addition of cross-linking agents. These cross-linking agents (hereinafter referred to as "cross-linkers") are also referred to in the art as "chain extenders". These compounds contain at least two hydroxyl groups and have a molecular weight of from about 32 to 600. These compounds also generally contain from 2 to 4 isocyanate reactive hydrogen atoms. Mixtures of different compounds containing at least two hydroxyl groups and having a molecular weight of from about 32 to about 600 may also be used.

Examples of such cross-linkers are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to 600, dipropylene glycol, higher polypropylene glycols having a molecular weight of up to 600, 4,4'-dihydroxydiphenyl propane, dihydroxy methyl hydroquinone, and the like.

Other cross-linkers having a molecular weight of up to 600 which may be used in accordance with the present invention are ester diols, diol urethanes and diol ureas. Suitable ester diols correspond to the general formula

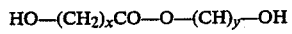

and

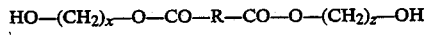

wherein
R represents an alkylene radical containing from 1 to 10, (preferably from 2 to 6) carbon atoms or a cycloalkylene or arylene radical containing from 6 to 10 carbon atoms;
x represents 2 to 6; and
y represents 3 to 5.

Examples of compounds corresponding to these formulae are δ-hydroxybutyl-ε-hydroxycaproic acid ester, ω-hydroxy-hexyl-γ-hydroxybutyric acid ester, adipic acid bis-(β-hydroxyethyl)-ester and terephthalic acid bis-(β-hydroxy-ethyl) ester.

Also included in the class of cross-linkers which may be used in the practice of the instant invention are secondary and tertiary amines having isocyanate-reactive hydrogen atoms. These include diethanol amine, triethanol amine, triisopropanolamine, N-methyl-diethanolamine, N-ethyl-diethanolamine, and N,N-dimethylethanolamine.

Reaction products of aliphatic amines, such as ethylene diamine and ethylene diamine, as well as aromatic compounds, such as aniline, with alkylene oxides, such as propylene oxide and/or ethylene oxide are also suitable. Materials such as these as commercially available as Crosslinker A (hereinafter defined), Crosslinker B (hereinafter defined) and Crosslinker C (hereinafter defined), respectively.

If amine cross-linkers are to be employed in the production of semi-rigid foams, the total weight of said amine cross linker(s) and amine catalyst(s) used in the production of said foam should not exceed 2.0 wt. % based on the total weight of the polyurethane-producing reaction mixture. Preferably, the sum of these amine-containing materials should not exceed 1.0 wt. %, while most preferably their presence should be kept below about 0.8 wt. %.

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane-polyoxyalkylene block copolymers such as the block copolymers described in U.S. Pat. Nos. 2,834,748 and 2,917,480. Another useful class of foam stabilizers are the "non hydrolyzable" polysiloxane-polyoxyalkylene block copolymers such as the block copolymers described in U.S. Pat. Nos. 3,505,377 and 3,686,254 and British Patent Specification No. 1,220,471. The latter class of copolymers differs from the above-mentioned polysiloxane-polyoxyalkylene block copolymers in that the polysiloxane moiety is bonded to the polyoxy-alkylene moiety through direct carbon to silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer Yet another useful class of foam stabilizer is composed of the cyanoalkyl polysiloxanes described in U.S. Pat. No. 3,905,924.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

As used in the Examples, the following designations, symbols, terms and abbreviations have the following meanings:

Crosslinker A—N,N,N$^1$,N$^1$-tetrakis-(2-hydroxypropyl)ethylene diamine. A polyol having a hydroxyl number of about 770 which is marketed by Wandotte Chemicals Corporation under the designation "Quadrol®".

Crosslinker B—An amine-containing polyol having a hydroxyl number of about 375 and a viscosity of about 22,000 cstk at 25° C. which is marketed by Union Carbide Corporation under the designation "Niax® Polyol BE 375".

Crosslinker C—An amine-containing polyol having a hydroxyl number of about 700 and a viscosity of about 20,000 cstk. @ 37.8° C. It is marketed by Union Carbide Corporation as Niax® Polyol LA-700.

Polyol A—A polymer/polyol of Polyol D (as hereinafter defined) and an acrylonitrile/styrene copolymer. The polymer/polyol contains about 23 weight percent solids and has hydroxyl number of about 28. It is marketed by Union Carbide Corporation as Niax® Polymer/Polyol E-501.

Polyol B—A polyol made by reacting propylene oxide and ethylene oxide with glycerol in the presence of potassium hydroxide catalyst and refining to remove catalyst. The polyol contains about 16 weight percent ethylene oxide as an end block and has hydroxyl number of about 29. It is marketed by Union Carbide Corporation under the designation "Niax® Polyol E-514".

Polyol C—A polymer/polyol composed of an acrylonitrile/styrene copolymer and Polyol B, having a solids content of about 28 weight percent and a hydroxyl number of about 21. It is marketed by Union Carbide Corporation as Niax ® Polymer/Polyol E-515.

Polyol D—A polymer/polyol composed of acrylonitrile and a glycerol ethylene oxide/propylene oxide polyol. The polymer/polyol has a solids content of about 21 weight percent and a hydroxyl number of about 28. It is marketed by Union Carbide Corporation as Niax ® Polymer/Polyol NP-31-28.

Polyol E—A polyol made by reacting propylene oxide and ethylene oxide with glycerol in the presence of potassium hydroxide catalyst and refining to remove catalyst. The polyol contains about 16 weight percent ethylene oxide as an end block and has hydroxyl number of about 36. It is marketed by Union Carbide Corporation as Niax ® Polyol E-518.

Polyol F—A polymer/polyol composed of an acrylonitrile/styrene copolymer and Crosslinker G, having a solids content of about 28 weight percent and a hydroxyl number of about 25. It is marketed by Union Carbide Corporation as Niax ® Polymer/Polyol E-519.

Catalyst 1—Bis(2-dimethylaminoethyl)ether

Catalyst 2—A mixture of 70 wt. percent of Catalyst 1 and 30 wt. percent dipropylene glycol.

Catalyst 3—A mixture of 33 wt. percent 3-Dimethylamino-N, N-dimethylpropionamide and 67% of Surfactant B (as hereinafter defined).

Catalyst 4—A mixture of 33% triethylenediamine and 67% dipropylene glycol.

Catalyst 5—A mixture of 52.5% of Catalyst 1, 22.4% dipropylene glycol and 25.1% formic acid (90%).

Catalyst 6—2-(2-dimethylaminoethoxy)ethanol

Catalyst 7—Dimethylethanolamine

Comparative Catalyst 1 (Comp. 1)—N, N, $N^1$, $N^1$-Tetramethyl-1, 6-hexanediamine.

Comparative Catalyst 2 (Comp. 2)—N,N,N',N',N''-Penta-methyldipropylenetriamine.

Comparative Catalyst 3 (comp. 3)—Dimethyl- hexadecylamine.

Surfactant A—A silicone surfactant sold for use in polyurethane foaming by Union Carbide Corporation as "Silicone Surfactant L-5309".

Surfactant B—An alkoxylated non-ionic surfactant sold by Union Carbide Corporation as "Tergitol ® TP-9".

Isocyanate 1—A modified polymeric isocyanate, marketed by Rubicon Chemicals as Rubinate ® MF-182.

Isocyanate 2—A modified polymeric isocyanate, marketed by Rubicon Chemicals as Rubinate ® MF 192.

Isocyanate A—A mixture of 50 weight percent of Isocyanate 1 and 50 weight percent Isocyanate 2.

Isocyanate B—A mixture of 70 weight percent of Isocyanate 1 and 30 weight percent Isocyanate 2.

Iso Pts.—Parts of Isocyanate A by weight, based upon total weight of Resin A, as hereinafter defined.

Density—Density in pounds per cubic foot (as determined by ASTM D-3574, Test A).

IFD, 25%—Indentation Force Deflection, 25% (as determined by ASTM D-3574, Test B1 and Test B2).

Viscosity—viscosities were measured by a Cannon Fensky viscometer (cstk) at the indicated temperature.

EXAMPLES

Tan colored vinyl cover stock (supplied by Davidson Rubber Company, Dover, N.H.) was placed in an aluminum mold having dimensions of 12 in.×12 in.×1 in. The thickness of the vinyl cover stock employed is set forth in Table I below. The vinyl cover stock was used in sufficient quantities to cover the interior of the mold. Duct tape was used to secure the vinyl cover stock. The mold was then preheated to 100° F.

A 0.5 gallon paper carton having a 5-inch inside diameter was placed within a larger, metal protective vessel. The vessel and the carton contained therein were then placed and centered upon a mixing apparatus consisting of the following components.
(a) 15.5" drill press (Sear's Craftsman Model 113.21371) equipped with a ½" chuck. The drill press was powered by a ½ horsepower motor and equipped with a 3 ft/lb integral brake.
(b) an agitator assembly consisting of a balanced stainless steel rod (¼" diameter ×8' long) having a 6-bladed straight turbine (2.5' in diameter×⅜" high) mounted at the end thereof.

A resin (hereinafter "Resin A") consisting of the following components was then prepared.

| | |
|---|---|
| Polyol A | 100 parts |
| Surfactant A | 1.5 parts |
| Crosslinker A | 1.0 parts |
| Crosslinker B | 5.0 parts |
| Water | 2.5 parts |

The proper amounts of the resin and amine catalyst(s) were then added to the paper carton The required amount of Isocyanate A was placed in a stainless steel beaker and set aside.

The mixing apparatus was then used to stir the contents of the paper carton for 55 seconds. After checking the mold temperature, the Isocyanate A was rapidly added to the paper carton, the contents of which were then mixed for an additional 5 seconds.

The contents of the paper carton were then quickly emptied into the mold. The mold was clamped and foam was allowed to cure for 3–8 minutes. The foam was then demolded.

The resulting vinyl covered foam panel was then aged for at least 72 hours in an environment having a temperature of 23° C. and a relative humidity of 50%. The panels were then cut with a bandsaw into pieces measuring about 4 in.×4 in. These pieces were then placed on racks and exposed to an elevated temperature (144.5° C. or 150° ±1° C.). The pieces were observed hourly to ascertain when vinyl staining first occurred. If staining did not occur during the workday, the samples were removed from the elevated temperatures overnight and the testing resumed the following morning. The total hours required to stain each panel was then noted.

TABLE 1

| VINYL STAINING RESISTANCE DATA AT 144.5° C. | | | | | | | | | |
|---|---|---|---|---|---|---|---|---|---|
| | EXAMPLE # | | | | | | | | |
| | 1 | 2 | 3 | 4 | 5 | 6 | 7 | 8 | 9 |
| Formulation (w/o catalyst) | | | | | | | | | |
| ISO Pts | 53.0 | 54.1 | 53.0 | 53.0 | 53.0 | 53.0 | 53.9 | 53.8 | 53.0 |

TABLE 1-continued

VINYL STAINING RESISTANCE DATA AT 144.5° C.

| | \#1 | 2 | 3 | 4 | 5 | 6 | 7 | 8 | 9 |
|---|---|---|---|---|---|---|---|---|---|
| Catalysts, Parts by Weight | | | | | | | | | |
| 1 | | | .130 | | | | | | |
| 2 | .35 | .35 | | | .219 | | .30 | .30 | .30 |
| 4 | | | | .30 | | | | | |
| 5 | | | | .30 | | .165 | | | |
| 6 | | | .745 | | | | | | .55 |
| 7 | .65 | .65 | | | | | .55 | .55 | |
| 3 | | | | 1.0 | | | | | |
| Comp. 1 | | | | | .656 | .337 | | | |
| Comp. 2 | | | | | | .248 | | | |
| Comp. 3 | | | | | | | .50 | .50 | |
| Total Catalyst Pts. | 1.00 | 1.00 | .875 | 1.60 | .875 | .750 | 1.35 | 1.35 | 1.35 |
| Catalyst Conc. % of Urethane Mix | .606 | .606 | .534 | 1.01 | .534 | .458 | .817 | .817 | .821 |
| Active Amine Conc. % of Urethane Mix | .542 | .463 | .542 | .360 | .494 | .410 | .762 | .763 | .767 |
| Urethane Processing (12 in × 12 in × 1 in mold at 100° F., 3-min demold) | | | | | | | | | |
| Exit, sec. | 19 | 35 | 20 | 23 | 16 | 23 | 17 | 14 | 17 |
| Density, pcf | 6 | 6.7 | 7 | 6.2 | 6.1 | 7.0 | 5.9 | 5.8 | 6.2 |
| 25% IFD, lf/50 in² | 523 | 310 | 389 | 408 | 420 | 445 | 373 | 345 | 401 |
| Vinyl Cover In. Thickness | .041 | .041 | .034 | .038 | .034 | .037 | .044 | .043 | .048 |
| Hours to Stain at 144.5° C. | 31 | 29 | 28 | 25 | 18 | 16 | 17 | 17 | 15 |

EXAMPLES 10-12

The procedure of Examples 1-9 were repeated except for the following differences.

1. The vinyl cover stock (Davidson Rubber Company, Dover, N.H.) was brown in color rather than tan. Its thickness is set forth in Table 2 hereto.
2. The resin employed (hereinafter "Resin B") consisted of the following components:

| | |
|---|---|
| Crosslinker B | 5.0 parts |
| Polyol B | 30 parts |
| Polyol C | 45 parts |
| Polyol D | 25 parts |
| Surfactant A | 1.0 parts |
| Crosslinker C | 2.0 parts |
| Water | 2.1 parts |

3. The isocyanate used was Isocyanate B.

The relevant data for Examples 10-12, including the total hours required to stain each panel produced therein, is set forth is Table 2.

EXAMPLES 13-15

The procedure of Examples 1-9 were repeated except for the following differences.

1. The brown vinyl cover stock of Examples 10-12 was again employed. Its thickness is set forth in Table 2 hereto.

2. The resin employed (hereinafter "Resin C") consisted of the following components:

| | |
|---|---|
| Polyol E | 30 parts |
| Polyol F | 30 parts |
| Polyol D | 40 parts |
| Surfactant A | 1.0 parts |
| Crosslinker C | 2.0 parts |
| Diethylene glycol | 4.0 parts |
| Water | 2.1 parts |

3. The isocyanate used consisted exclusively of Isocyanate 1.

The relevant data for Examples 13-15, including the total hours required to stain each panel produced therein, is set forth is Table 2.

A comparison of Examples 10-12 and Examples 13-15 illustrates the effect of amine crosslinker content on the vinyl staining time. The crosslinkers used in Examples 10-12 are amine-containing while in Examples 13-15, a portion of these crosslinkers have been replaced by diethylene glycol, a non-amine crosslinker. As demonstrated by the data within Table 2, foams having approximately equal active amine catalyst concentration exhibit markedly different periods to effect vinyl staining, with these periods appearing to be related to the level of amine crosslinker present therein.

TABLE 2

VINYL STAINING RESISTANCE DATA AT 144.5° C.

| | EXAMPLE \#10 | 11 | 12 | 13 | 14 | 15 |
|---|---|---|---|---|---|---|
| Formulation (w/o catalyst) ISO Pts. | 110.1 | 110.1 | 110.1 | 109.1 | 109.1 | 109.1 |
| Catalysts, Parts by Weight | | | | | | |
| 1 | .15 | .17 | .13 | .075 | .11 | .15 |
| 7 | .60 | .68 | .52 | .425 | .64 | .85 |
| Total Catalyst Pts. | .75 | .85 | .65 | .50 | .75 | 1.00 |
| Catalyst Conc. % of Urethane Mix | .477 | .540 | .413 | .305 | .457 | .609 |
| Active Amine Conc. | .477 | .540 | .413 | .305 | .457 | .609 |

TABLE 2-continued

VINYL STAINING RESISTANCE DATA AT 144.5° C.

| | EXAMPLE # | | | | | |
|---|---|---|---|---|---|---|
| | 10 | 11 | 12 | 13 | 14 | 15 |
| % of Urethane Mix | | | | | | |
| Urethane Processing (12 in × 12 in × 1 in mold at 100° F., 3-min demold) | | | | | | |
| Exit, sec. | 29 | 27 | 33 | 45 | 32 | 27 |
| Density, pcf | 6.2 | 5.8 | 6.1 | 7.4 | 6.8 | 6.0 |
| 25% IFD, lf/50 in$^2$ | 321 | 270 | 311 | 462 | 380 | 330 |
| Vinyl Cover In. Thickness | .041 | .047 | .047 | .051 | .052 | .051 |
| Hours to Stain at 144.5° C. | 29 | 27 | 31 | 42 | 39 | 38 |

I claim:

1. A process for the production of polyurethane foams which exhibit a reduced tendency to stain vinyl films adhered thereto comprising:
   (a) forming a reaction mixture comprising
      (i) at least one polyol;
      (ii) at least one polyisocanate;
      (iii) a catalyst consisting essentially of at least one amine catalyst having an average molecular weight of no greater than about 160, wherein said amine catalyst comprises less than about 1.0 wt. % of the reaction mixture and is selected from the group consisting of triethylamine, bis(2-dimethylaminoethyl)ether, dimethylenthanolamine, N-methyldiethanolamine, 2-(2-dimethylaminoethoxy)ethanol and mixtures thereof; and
      (iv) at least one amine crosslinker selected from the group consisting of the reaction products of triethanol-amine, trisisopropanolamine, N-methyl-diethanolamine, N-ethyl-diethanolamine, N,N-dimethyl-ethanolamine and mixtures thereof with alkylene oxides and wherein said amine catalyst and said amine crosslinker are present in such amounts such that their sum comprises less than about 2.0 wt. % of the reaction mixture; and
   (b) contacting said reaction mixture with a vinyl film;
   (c) reacting the reaction mixture under suitable conditions to form a polyurethane foam with the vinyl film adhered thereto.

2. The process of claim 1 wherein said amine catalyst and said amine crosslinker are present in such amounts such that their sum comprises less than about 1.0 wt. % of the reaction mixture.

3. The process of claim 1 wherein said amine catalyst and said amine crosslinker are present in such amounts such that their sum comprises less than about 0.8 wt. % of the reaction mixture.

4. The process of claim 1 wherein said amine crosslinker is selected from the group consisting of triethanol-amine, triisopropanolamine, N-methyl-diethanolamine, N-ethyl-diethanolamine, N,N-dimethyl-ethanolamine and mixtures thereof.

5. The process of claim 1 wherein said alkylene oxides are selected from the group consisting of propylene oxide and ethylene oxide.

6. The process of claim 1 wherein said amine catalyst comprises less than about 0.8 wt. % of the reaction mixture.

7. The process of claim 1 wherein said amine catalyst comprises less than about 0.6 wt. % of the reaction mixture.

8. The process of claim 1 wherein amine catalyst having an average molecular weight of no greater than about 145.

9. The process of claim 8 wherein said amine catalyst comprises less than about 0.8 wt. % of the reaction mixture.

10. The process of claim 8 wherein said amine catalyst comprises less than about 0.6 wt. % of the reaction mixture.

11. The process of claim 1 wherein said amine catalyst is selected from the group consisting of bis(2-dimethylaminoethyl)ether, dimethylethanolamine and N-methyldiethanolamine and mixtures thereof.

12. The process of claim 1 wherein said amine catalyst consists essentially of about 15 wt. % of bis(2-dimethylaminoethyl-ether) and about 85 wt. % dimethylethanolamine.

13. The process of claim 9 wherein said amine catalyst consists essentially of about 15 wt. % of bis(2-dimethylaminoethyl ether) and about 85 wt. % dimethylethanolamine.

14. The process of claim 10 wherein said amine catalyst consists essentially of about 15 wt. % of bis(2-dimethylaminoethyl ether) and about 85 wt. % dimethylethanolamine.

* * * * *